July 28, 1942.　　　　C. J. LEVEY　　　　2,291,395
PIPE CUTTING MACHINE
Filed Dec. 15, 1939　　　3 Sheets-Sheet 1
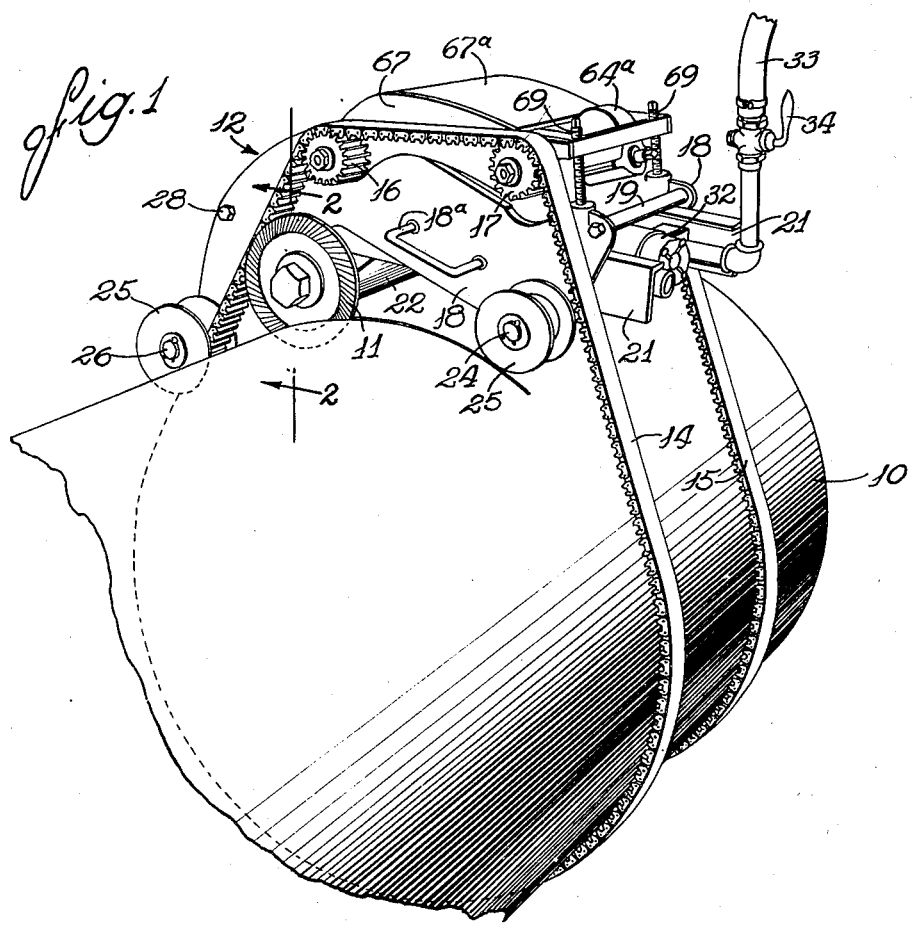
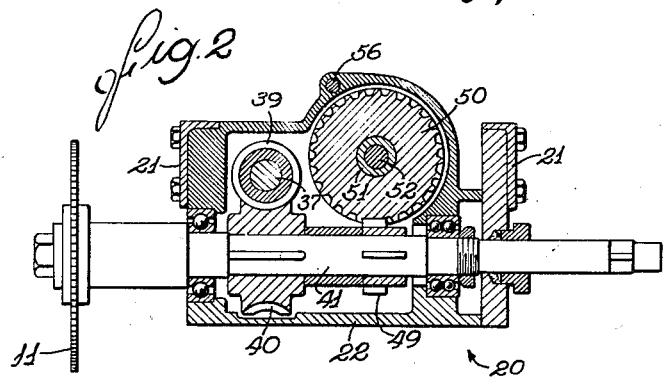
INVENTOR
Clarence J. Levey
By Parker, Carlson, Pitzner & Hubbard
ATTORNEYS July 28, 1942. C. J. LEVEY 2,291,395
PIPE CUTTING MACHINE
Filed Dec. 15, 1939 3 Sheets-Sheet 2
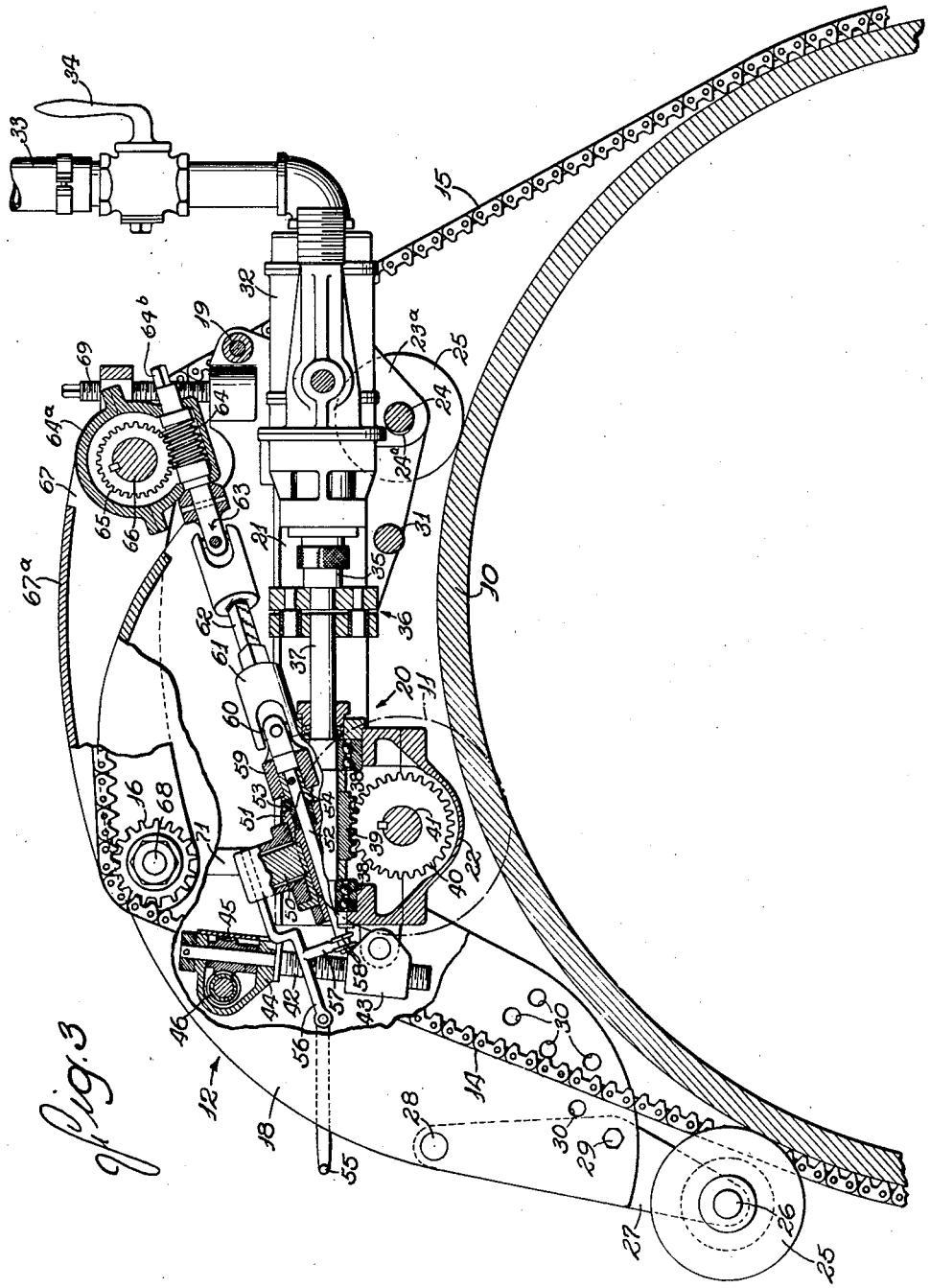
INVENTOR
Clarence J. Levey
By Parker, Carlson, Pitzner & Hubbard
ATTORNEYS

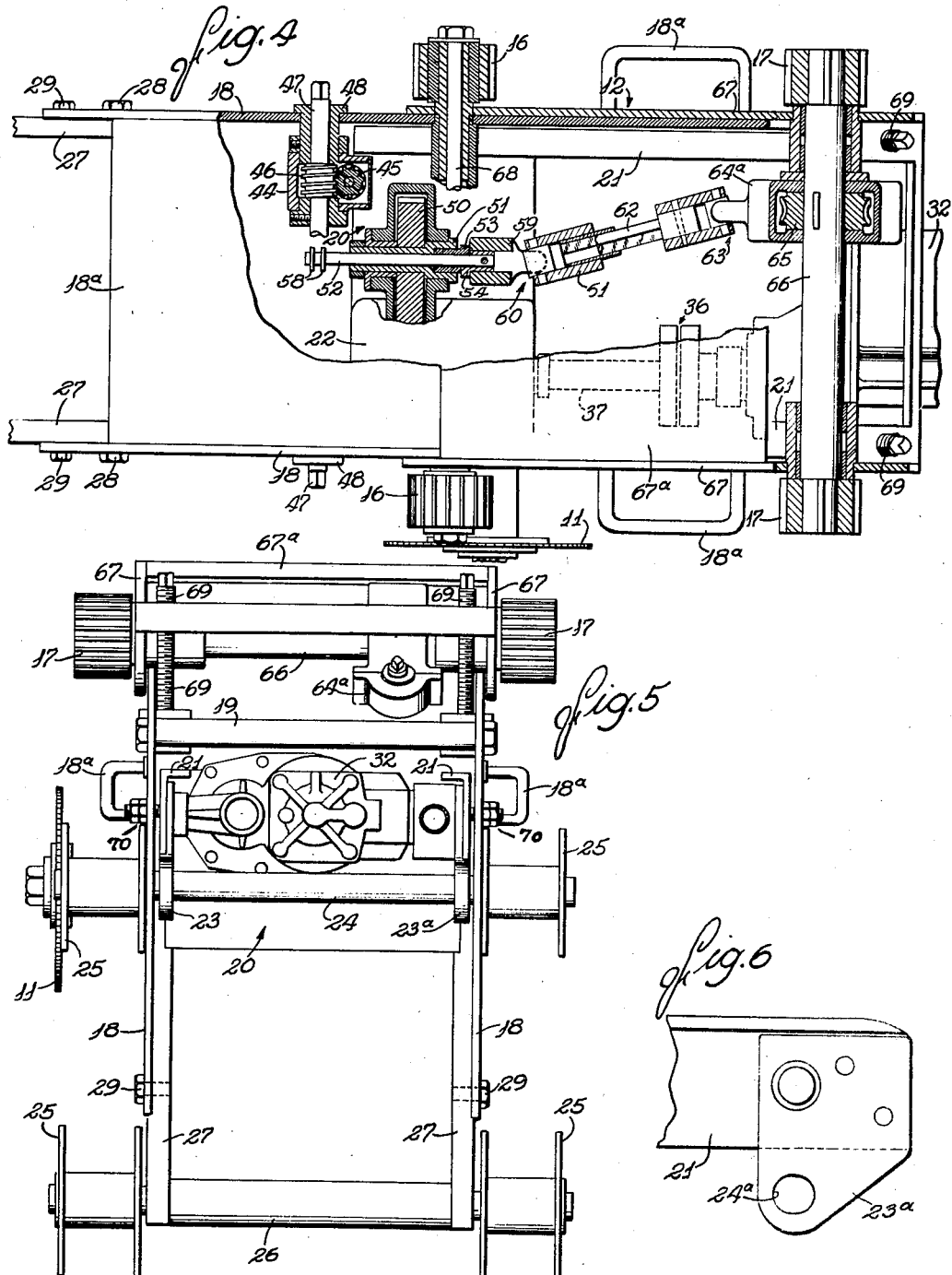

Patented July 28, 1942

2,291,395

UNITED STATES PATENT OFFICE 2,291,395

PIPE CUTTING MACHINE

Clarence J. Levey, Park Ridge, Ill., assignor to National Machine Works, Chicago, Ill., a corporation of Illinois Application December 15, 1939, Serial No. 309,425

10 Claims. (Cl. 29—69)

The invention relates to pipe cutting machines.

One problem which the present invention solves is the cutting of pipes located in trenches or other points similarly difficult of access. For example, in repairing or adding connections to installed gas mains it is frequently necessary to dig a trench around the pipe and cut out a section of it preparatory to inserting a new section. In such case the pipe must be severed circumferentially at spaced points while in the trench, a procedure that precludes the use of ordinary power tools because of the confined location of the work. On the other hand, cutting of the pipe manually is not only an expensive and laborious job but is so slow that it may seriously impair public utility service if the pipe is, say, a gas or water main. Also precluded, in the case of a gas main, is the possibility of cutting it with an acetylene torch because of the hazard of explosion involved.

Generally stated, the aim of the present invention is to provide a power driven machine which can be readily applied to a pipe in a trench or a similar location, and operated with a minimum of clearance to sever the pipe circumferentially.

A more specific object is to provide a machine for circumferentially severing a pipe in such a situation as that described, which will complete its severing operation without damaging or weakening the adjoining portion of the pipe.

Another object is to provide a machine of the character indicated embodying a cutting tool carriage, and a novel form of drive including a chain encircling the pipe and looped over a meshing drive pinion on the carriage so that the chain forms in effect a flexible ring gear for the pinion, the chain being held against displacement circumferentially of the pipe by its frictional engagement with the latter.

Still another object is to provide a machine of the character indicated which embodies a novel arrangement for quickly and accurately accommodating the machine to pipes of different diameters.

The invention also resides in a novel arrangement for preventing spiraling of the cut.

Further objects and advantages of the invention will become apparent as the following description proceeds, taken in connection with the accompanying drawings in which:

Figure 1 is a general perspective view of a pipe cutting machine embodying the invention and illustrating its use.

Fig. 2 is an enlarged detail sectional view taken generally along the line 2—2 in Fig. 1.

Fig. 3 is an enlarged side elevation, partially in section, of the machine of Fig. 1.

Fig. 4 is a plan view, partially in section, of the machine.

Fig. 5 is an end elevation of the machine taken from the right hand or rear end, as viewed in Fig. 1.

Fig. 6 is a fragmentary side elevation of one end of the motor chassis.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

For purposes of exemplification, the invention has been shown and described herein as embodied in a portable pipe cutting machine. In Fig. 1 this machine has been shown as applied to the cutting of a pipe 10, which may be, for example, a cast iron gas main located in a trench or other confined place difficult of access. The machine comprises a power driven rotatable cutter or circular saw 11 located at one side of a carriage 12. In brief, the rotating cutter is moved inward of the pipe until it penetrates it and then the carriage is advanced circumferentially of the pipe so that the latter is severed completely by the cutter. To confine the carriage 12 to the pipe periphery, and to form a flexible toothed track for its feed mechanism, a pair of chains 14 and 15 are arranged to encircle the pipe and are led over pairs of pinions 16 and 17 on the carriage. Rotation of certain of the pinions, which mesh with the chains, advances the carriage.

In the instant machine, the carriage 12 comprises a pair of spaced side plates 18 rigidly joined by tie rods 19 at their opposite ends. Also included in the carriage is a motor chassis, designated generally as 20 (Fig. 3), and located between the side plates 18. This chassis comprises a pair of longitudinally extending bars 21 of inverted L-shaped cross section (Fig. 5) and a gear case 22 fixed to the inner ends of these side bars. An adjustable pivotal support for the motor chassis 20, within the carriage side plates 18, is afforded by a pair of depending bracket arms 23 and 23ª (Fig. 5) fixed to the forward or outer ends of the side bars 21 and loosely journaled on a shaft 24 extending transversely through the carriage side plates. By swinging the chassis 20 up and down between the carriage side plates, about its supporting shaft 24, the depth of cut for the cutter 11 is correspondingly changed, this cutter element being carried at the inner end of the motor chassis as will hereinafter appear in greater detail.

Four wheels 25 are arranged at the respective corners of the carriage 12. Means is provided for adjusting the relative spacing of these wheels with respect to each other and to the carriage 29 to accommodate pipes of different diameters. For this purpose the pair of wheels 25 at the left or forward end of the carriage are journaled on a transverse shaft 26 mounted on the lower ends of a pair of links 27, pivoted at their upper ends on the respective side carriage plates 18 by pins 28 (Fig. 3). Stop pins 29 are inserted in one of a corresponding series of holes 30 in the side plates so as to retain the front set of wheels 25 in the desired position. Each of the holes 30 corresponds to one of a series of standard pipe diameters which may be commonly encountered such, for example, as 12, 16, 20, 24, 30 and 36 inch diameter and the holes may be marked with suitable indicia to indicate the proper setting. The other, or rear set of wheels 25 are carried by the shaft 24 for all diameters of pipe except the minimum or 12 inch size. For such small pipe this rear set of wheels is moved to an alternative transverse shaft 31 (Fig. 3).

It will be observed that each of the wheels 25 is provided with a pair of spaced flanges so that the chains 14 and 15 can be led either over or under the wheels, as the particular setting of the latter may require, without any interference with the wheels. By this means a maximum width of wheel base is used, which gives maximum stability. On the other hand the chains are spaced apart a maximum distance to give ample clearance beneath the carriage for nipples or other projections on the pipe, and one of the chains is located closely adjacent the cutter, thereby minimizing the moment arm between the cutter and chain which tends to cause spiraling of the cut.

To drive the carriage 12, as well as to rotate the cutter 11, a self-contained power unit is preferably mounted on the carriage and supplied with power through some flexible form of connection such as a cable or hose. In the present instance an air motor 32 is fixed between the motor chassis side bars 21 (Figs. 1 and 3), this motor being of the form commonly used in pneumatic drills and, hence, requiring no details of description. It is supplied with compressed air through a flexible hose 33 and controlled by the usual hand valve 34. A sufficient length of hose is provided so that it can be wound completely about the pipe 10 during the cutting operation and without interfering with the progress of the carriage.

To connect the motor 32 with the cutter 11, a speed reducing worm drive is used (Figs. 2 and 3). In particular, the motor outlet shaft 35 is connected by flexible coupling 36 with an alined shaft 37, which extends longitudinally of the motor chassis 20 and is journaled in suitable anti-friction bearings 38 on the chassis. Fixed on the shaft 37 is a worm 39 meshing with a worm wheel 40 keyed to a transverse shaft or saw spindle 41. This shaft 41 is suitably journaled within the gear case 22 and projects beneath one of the arched carriage side plates 18, with the cutter 11 fixed to its outer end. The cutter is displaced laterally from the plane of the outer faces of the adjacent wheels 25, only a very short distance so as to have a minimum overhang with respect to the carriage.

By the arrangement described, a simple and compact drive for the cutter 11 is afforded. The ratio of the worm and worm gear 39, 40 is such as to give a proper rotational speed for the cutter when using a standard speed air motor. Since the motor is of conventional form it may be readily replaced by an identical unit in the event of motor break-down.

Provision is also made for adjusting the depth of cut for the saw or cutter 10. As was heretofore noted, the motor chassis 20 may be swung in a vertical direction, about its pivotal supporting shaft 24, to move the cutter 11 toward and away from the pipe 10. To effect such adjusting movement of the motor chassis an adjusting screw 42 (Fig. 3) is threaded in a fixed nut 43 pivoted on the inner end of the motor chassis. The upper end of this screw 42 is rotatably journaled in a housing 44 and has fixed to it a worm wheel 45 which abuts against the end walls of the housing to restrain the screw against axial movement. Meshing with the worm wheel 45 is a worm 46 fixed on a stub shaft 47, which is journaled in and projects laterally from a bushing 48 in one of the carriage side plates 18. It will be noted that the housing 44 is pivoted on this bushing so that the housing, as well as the screw 42 may swing about the axis of the shaft 47 to accommodate changes in vertical displacement of the connected end of the motor chassis 20. To rotate the screw 42, and thus move the motor chassis 20 up or down, the operator rotates the stub shaft 47 by means of a wrench or hand crank (not shown) applied to the squared end of the shaft.

Turning now to the details of the drive mechanism for the carriage 12, it will be observed that, of the two pairs of chain pinions 16 and 17, the pinions 16 are idlers, and the other pair 17 are driven by the air motor 32 (Figs. 3 and 4). In general, the drive for the pinions 17 is derived from the cutter spindle 41 and a clutch is interposed in the connection so that it can be engaged or disengaged at will without stopping the cutter. In particular, a spiral gear 49 (Fig. 2) keyed to the spindle 41 meshes with a second spiral gear 50, which is in turn fixed to a sleeve 51 (Fig. 3). This sleeve is loosely journaled on an upwardly inclined shaft 52 which is axially slidable in the motor chassis 20, the sleeve 51 being restrained against axial movement by abutments on the chassis.

The clutch comprises a toothed driving element 53 (Fig. 3 and see also Fig. 4) fixed to the end of the sleeve 51 and a complementally toothed driven element 54 pinned to the upper end of the shaft 52. By shifting the shaft 52 axially the clutch driven element 54 is moved into and out of engagement with the driver 53. Such shifting of the clutch element 54 is accomplished by a manual operating handle 55 pivotally connected to a guide rod 56 which is axially slidable in a bore formed in the gear case 22. Projecting from the lower side of this guide rod is a fork 57 which embraces the lower end of the shaft 52 between a pair of fixed collars 58 on it.

Fast on the clutch driven element 54 is a sleeve 59 connected by a universal joint 60 with a sleeve 61. This latter sleeve is splined for axial sliding movement on an intermediate shaft 62 so that the whole sleeve and joint assembly will be free to move with the shiftable clutch element 54. The upper end of the intermediate shaft 62 is connected by a second universal joint 63 with a worm 64 meshing with a worm wheel 65, which is keyed to a shaft 66 that carries the chain drive pinion 17. This worm is journaled in a housing 64ª enclosing the worm wheel and loosely mounted on the shaft 66 to swing about the latter. It will thus be seen that the pinions 17 are effectually driven by the air motor 32 so that they roll along the meshing chains 14 and 15 in the manner of pinions advancing along an internal gear and thereby feed the carriage 12 circumferentially of the pipe 10.

In order for the carriage drive described to function properly the chains 14 and 15 must have a sufficiently tight friction grip on the pipe 10 that they will not slip. Accordingly, provision is made for forcing one of the pairs of pinions, in this instance, the pinion 17, up into the loops of the chains so as to take up any slack and draw the chains taut. For this purpose the shaft 66, carrying the pinions 17, is journaled between the forward ends of a pair of links 67 (Figs. 1 and 3). The inner ends of these links are pivoted on a transverse shaft 68, which carries the idler pinions 16. To swing the links 67 upward, and thus feed the pinion 17 into the chain loops, adjusting screws 69 are used. The lower ends of these screws are socketed in the carriage side plates 18 and the screws themselves are threaded in tapped holes provided with lugs on the projecting ends of the links 67. The operator applies a wrench or hand crank to the squared ends of screw 69 in order to turn them and thus swing the links 67 up or down. It will be appreciated that the universal joints 60 and 63, heretofore described as interposed in the drive connection for the pinions 17, permits complete freedom of adjusting movement for the links 67 without interrupting the drive connection to the pinions 17.

The chains 14 and 15 are of a well known form available on the market. In brief, they consist of a series of articulated or pivotally connected bars and on each of these bars is an inwardly projecting, rounded tooth. These teeth are fashioned to mesh with the pinions 16, 17 and also provide a good frictional grip on the periphery of the pipe 10 although they are sufficiently rounded to avoid cutting or abrading the latter.

Because of the lateral displacement of the cutter 11 with respect to the lines of action of the drive pinions 17 circumferentally of the pipe, there is a tendency for the cutter to make a spiral rather than a true circular cut. As a means of overcoming this undesirable tendency provision has been made for skewing the motor chassis 20 within the confines of the carriage side plates 18. In this way the cutter 10 itself is skewed slightly with respect to the planes in which the drive pinions move and the spiraling tendency compensated. To this end, adjusting screws 70 (Fig. 5) are threaded in the carriage side plates 18 with their inner ends abutting against the opposed intermediate portions of the chassis side bars 21 adjacent the rear ends of the latter. At their forward or inner ends the chassis side bars are confined against more than a limited lateral displacement by a pair of vertical brass pads 71 (Fig. 3) fixed to the inner faces of the respective side plates 18. At the outer or rear ends of the side bars 21, the supporting shaft 24 is received in an elliptical hole 24ª (Fig. 6) in the bracket 23ª which is on the side of the carriage remote from the saw, although the corresponding shaft receiving hole in the other bracket 23 is round and snugly fits the shaft. Thus, by manipulating the adjusting screws 70 the chassis side bars 21 can be flexed laterally one way or the other, about the bracket 23 as a fulcrum in view of the play permitted by the hole 24ª, and the axis of the cutter 11 is correspondingly shifted.

To form a partial enclosure for the machine a cover plate 18ª (Fig. 4) is secured between the upper edges of the side plates 18 for the carriage. At its forward end this cover stops short of the wheel-supporting links 27 so that the latter are free for adjustment. At its inner end it terminates adjacent the inner end of the pinion-supporting links 67. A second cover section 67ª extends between the upper edges of the links 67 and closes the top of the rear portion of the carriage. Handles 18ª on the sides of the carriage facilitate carrying it about and placing it on the pipe (Fig. 1).

In the operation of the machine described, the wheels 25 of the carriage 12 are first adjusted, as heretofore described, for the diameter of pipe 10 to be cut, and the carriage is set in place on top of the pipe (Fig. 1). The chains 14, 15 are opened, that is, a link disconnected, and then the chains are wrapped about the pipe and over the pinions. Having drawn the chains snugly around the pipe they are reconnected, as many links as necessary being removed. Then to complete the tightening of the chains, the operator applies a wrench to the squared ends of the adjusting screws 69 and turns the latter to swing the links 67 upward until the chains are taut. It is assumed that the screws 70 have been initially adjusted to skew the saw spindle a sufficient amount to prevent spiraling of the cut.

Having located the machine in place, as described, the operator pushes in on the handle 55 (Fig. 3) to open the clutch 53, 54 and then starts the saw 10 rotating by opening the air motor valve 34. With the saw in rotation it is lowered into penetrating engagement with the pipe for the depth of cut desired, usually a full penetration of the pipe wall. For this purpose the operator turns the adjusting screw 42 by a wrench applied to the squared end of the stub shaft 47. Thereafter, the clutch 53, 54 is engaged, thereby connecting the drive pinions 17 to the power driven saw spindle 41. These pinions roll along their meshing chains pushing the carriage 12 circumferentially about the pipe 10 in a counterclockwise direction (as viewed in Fig. 1). The chains frictionally grip the pipe so that they form, in effect, non-rotating, flexible, interiorly-toothed ring gears for the pinions. In this way the pipe is severed quickly and cleanly.

At the completion of the cut the operator simply stops the air motor. Then the chain tension can be released and the machine completely removed, or it may be slid along the pipe to new cutting position and the operation repeated so as to cut a complete section from the pipe.

It will be observed that the peripheries of the wheels 25 are smooth so that they have no tendency to dig into or gouge the pipe surface. Similarly, since the chains 14, 15 do not slide over the pipe they have little or no abrading effect on the pipe even though they are toothed. Consequently, even a pipe weakened by corrosion or electrolysis will not be broken by the machine. In all, quick and efficient power cutting of heavy metal pipe is made possible by this machine even though the location of the work is extremely confined and difficult of access.

If the operator desires to advance the carriage 12 by hand rather than by power feed this can be done. He opens the clutch 53, 54 and then applies a wrench or hand crank to the squared end 64$^b$ (Fig. 3) of the worm shaft to rotate the drive pinions 17 manually.

I claim as my invention:

1. In a machine of the type described, the combination of a carriage movable circumferentially about a pipe and having a cutter thereon; an endless chain comprising a series of articulated, interiorly toothed members, forming a flexible ring gear adapted to encircle the pipe; a feed pinion on the carriage positioned to mesh with the chain teeth when the chain is led about the pipe and pinion; and power actuated means on said carriage for driving said feed pinion.

2. A machine for severing circumferentially pipes of various diameters comprising, in combination, a carriage, a rotatable cutter on said carriage, means for supporting said carriage in rolling contact with the pipe periphery to move circumferentially about it, a rotatable feed pinion on said carriage, a self-contained power unit on said carriage for driving said cutter and feed pinion, and means for not only confining said carriage to the pipe periphery but for also cooperating with said pinion to form therewith a feed mechanism for the carriage, said last named means comprising an endless chain adapted to encircle the pipe and pinion, said chain presenting a series of inwardly projecting articulated teeth meshing with the pinion and frictionally engaging the pipe periphery.

3. In a pipe cutting machine, the combination of a carriage movable circumferentially about a pipe; a cutter rotatably mounted on said carriage; an endless, flexible, toothed chain dimensioned to encircle the pipe; a rotatable feed pinion on the carriage in meshing engagement with said chain; and a single power unit on said carriage for driving not only said feed pinion but also said cutter.

4. In a pipe cutting machine, the combination of a carriage movable circumferentially about a pipe and having a cutter thereon; an endless, flexible, toothed chain dimensioned to encircle the pipe in frictional engagement with it; and a feed pinion on the carriage arranged in meshing engagement with said chain.

5. A pipe cutting machine comprising, in combination, a carriage frame including a pair of arched longitudinally extending side plates joined by transverse reenforcing members, a motor chassis disposed between said side plates and having a rotatable cutter spindle thereon projecting laterally beneath one of said arched side plates, a first pair of wheels located at one end of said carriage and rotatably mounted on the adjacent end portions of said side plates, a second pair of wheels disposed at the opposite end of said carriage, a pair of links pivotally mounted on respective ones of said side plates at said opposite end of the carriage and projecting generally downward therefrom, said second pair of wheels being journaled on the free end portions of said pivoted links, and means for fixing said links in selected positions of pivotal adjustment with respect to said side plates to vary the spacing between said pairs of wheels longitudinally of the carriage and thereby accommodate the latter to pipes of different diameters.

6. In a pipe cutting machine, the combination of a generally rectangular carriage having four wheels arranged at its respective corners for rolling contact with the pipe periphery, a cutter on the carriage, means for journaling one pair of said wheels at one end of the carriage, and means at the other end of said carriage connected thereto and adjustable generally longitudinally thereof, the other pair of wheels being journaled on said last named means, whereby the spacing of the pairs of wheels longitudinally of the carriage may be adjusted by the movement of said last named means to accommodate the carriage to pipes of different diameters.

7. A machine of the type described comprising, in combination, a carriage movable circumferentially about a pipe to be cut, a rotatable cutter spindle projecting laterally from the carriage, first and second pairs of wheels arranged at the forward and rear ends of the carriage, the wheels on respective sides of the carriage being alined longitudinally of it, each of said wheels embodying a pair of spaced annular flanges, a pair of pinions journaled on opposite sides of the carriage in the vertical planes of the wheels on the adjacent side of the carriage, a pair of endless chains led over respective ones of said pinions and adapted to encircle a pipe to which the carriage is applied, said chains being arranged to pass between the flanges of the adjacent wheels, and a disk shaped cutter on the projecting end of said spindle lying in a plane outside of but close to the outer faces of the wheels on the adjacent side of the carriage.

8. In a machine of the type set for, the combination of a carriage, means for moving the same circumferentially about a pipe while confining it to the pipe periphery, the line of action of the force applied to the carriage by said last named means lying in a plane passing longitudinally through the carriage, a rotatable cutter spindle projecting laterally from the carriage and having a disk shaped cutter on its outer end, and means for adjustably skewing said spindle with respect to the carriage to compensate for the tendency of the carriage to spiral about the pipe due to the lateral displacement of the cutter with respect to the line of action of the carriage advancing means.

9. In a pipe cutting machine, the combination of a carriage embodying a pair of laterally spaced and longitudinally extending frame members, a drive pinion, means on the carriage supporting said pinion for rotation about an axis transverse to the carriage, means including an endless chain adapted to be looped about a pipe and the pinion in mesh with the latter for moving the carriage circumferentially about the pipe, a motor chassis disposed between said frame members and having a transversely extending cutter spindle journaled adjacent one end of the chassis and projecting laterally from the carriage, a disk shaped cutter on a projecting end of said spindle, means for pivotally supporting the other end of said chassis on said frame, said last named means including a transverse shaft between said frame members passing through registering apertures on opposite sides of the adjacent end portion of the chassis, one of said apertures fitting the shaft snugly and the other loosely, and adjusting means for skewing said chassis laterally between said frame members and about said shaft at the point of the snug fit of said one aperture as a fulcrum to vary the angular position of said cutter disk with respect to the plane of said chain.

10. In a pipe cutting machine, the combination of a wheeled carriage frame movable circumferentially about a pipe to be cut, a motor chassis having a rotatable cutter spindle journaled thereon with a cutter on said spindle, means for adjustably supporting said chassis on said frame to vary the position of said cutter relative to the pipe by adjusting the position of the chassis with respect to said frame, a driving motor on said chassis operatively connected to said cutter spindle, a drive pinion, an endless chain adapted to encircle the pipe and said pinion in mesh with the latter, means supporting said pinion for adjusting movement relative to the carriage frame to vary the tension in said chain, and means forming a flexible drive connection between said motor and said pinion, its flexibility permitting the adjusting movement of either or both said chassis and pinion without interfering with the pinion drive.

CLARENCE J. LEVEY.